April 15, 1969 H. P. MATTIOLI 3,438,301
HOLLOW RIVET AND PULL-STEM ASSEMBLY FOR BLIND
FASTENING OR THE LIKE
Filed April 10, 1967 Sheet 1 of 4

INVENTOR.
HAROLD P. MATTIOLI

BY
McCormick, Paulding & Huber
ATTORNEYS.

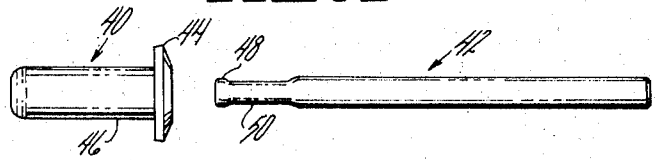
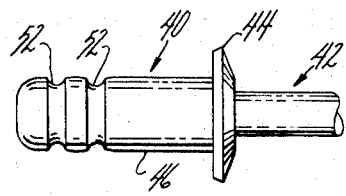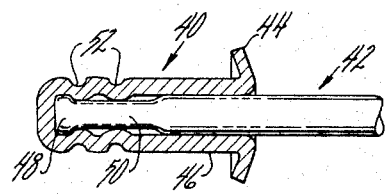
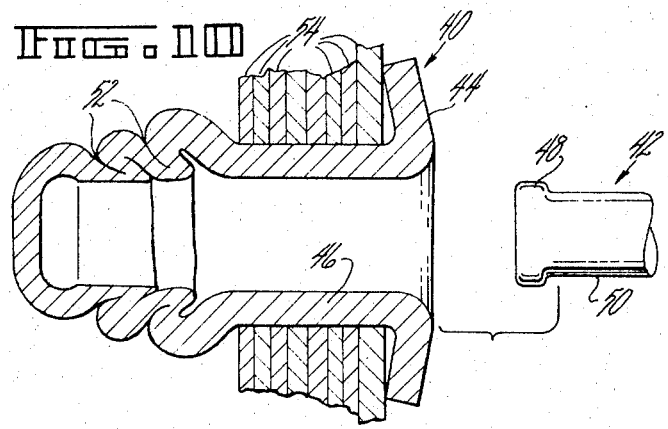
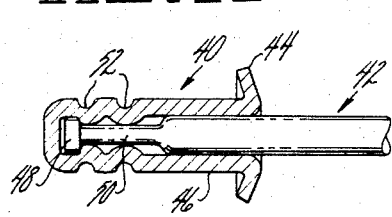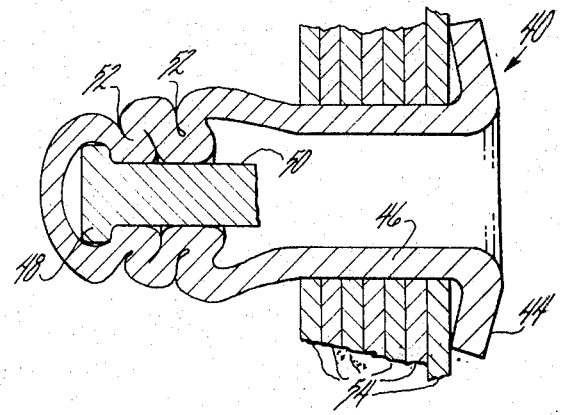

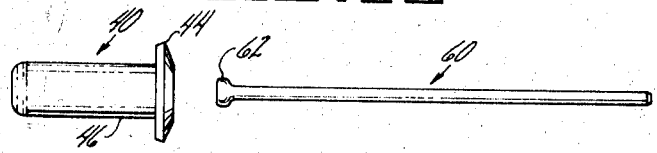
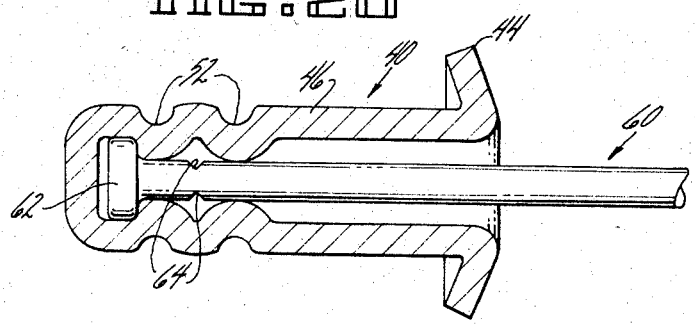
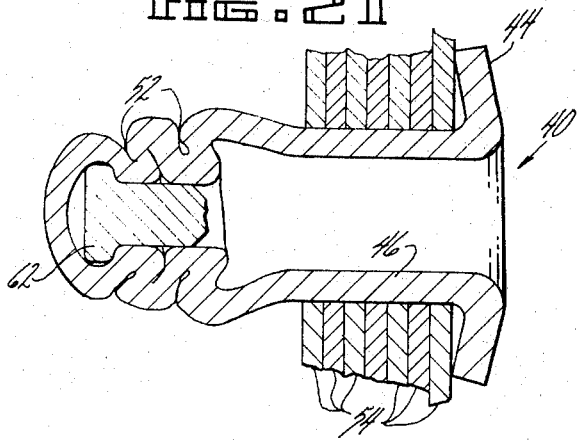

United States Patent Office 3,438,301
Patented Apr. 15, 1969

3,438,301
HOLLOW RIVET AND PULL-STEM ASSEMBLY FOR BLIND FASTENING OR THE LIKE
Harold P. Mattioli, Simsbury, Conn., assignor to Emhart Corporation, Bloomfield, Conn., a corporation of Connecticut
Filed Apr. 10, 1967, Ser. No. 629,486
Int. Cl. F16b 33/04, 13/12
U.S. Cl. 85—70                                14 Claims

ABSTRACT OF THE DISCLOSURE

A preferably closed end hollow rivet having a head and a headed stem or mandrel inserted in its bore with at least one and preferably more annular grooves formed in the rivet body by rolling or otherwise pressing the body inwardly so that in the course of forceful retraction of the stem, its head will substantially close the rivet body grooves and tend to draw the grooved portion of the body telescopically within the adjacent portion of the rivet body while diametrically enlarging the rivet body between its head and its grooved portion. The stem can be made to break in the course of retraction after the rivet body grooves have been substantially closed, or it can have sufficient tensile strength to withstand complete retraction so that the step head will re-define substantially smooth and uniform rivet bore.

Background of the invention

The known closed end rivet and mandrel assemblies employ rivets made of non-ferrous material which are extruded in manufacture to be shaped around the stem or mandrel head. Such stems or mandrels are generally provided with a reduced diameter section which will break during retraction of the stem from the hollow rivet body. During such forceful retraction, the stem head enlarges the bore of the rivet body and shortens its body length, and in so doing, the rivet body is progressively bulged or diametrically enlarged in the external area of the rivet outside the location of the stem head. At the present time, closed end rivets are not provided in steel or other refractory materials because of the economic disadvantages of manufacturing them. (The term "refractory" is used herein to designate difficult to work metals and not to designate heat-resistant ceramics.)

Summary of the invention

In accordance with the present invention, a closed end rivet and stem assembly is provided which is adapted for manufacture from steel or other more refractory materials than those presently utilized and the rivet when set has a grip range which will meet or exceed commercial requirements.

Accordingly, it can be said that it is the general object of the present invention to provide a hollow rivet and pull-stem assembly for blind or visible fastening in rivet openings covering a relatively large range in opening depth for each rivet length provided.

It is a further object of the invention to provide such a construction wherein the stem can be broken off during retraction, but after the rivet has been set, and left embedded in the rivet, or fully retracted to leave the rivet with a substantially smooth and uniform bore capable of providing a bearing or journal. In keeping with this object, it is also desired to provide a construction wherein the rivet can be set and then the stem can be cut-off at the rivet head to increase the shear strength of the set rivet.

In achieving these objects, a hollow rivet is employed and it is provided with one or more annular grooves by being pressed, as by rolling, radially inwardly toward the shank of the stem and adjacent the stem head. Then, in the course of retraction of the stem, the grooves in the rivet body are substantially closed and the rivet body is diametrically enlarged with the greatest enlargment occurring in the part of the rivet body projecting from the work. When the stem is provided with sufficient tensile strength, it can be fully retracted and its head will then draw the grooved portions of the rivet body telescopically within the adjacent body portions of the rivet to define the desired smooth bore therein.

Brief description of the drawings

FIG. 7 is a view similar to FIG. 1 showing the elements of the assembly in a second or "multiple groove" embodiment.

FIG. 8 shows the elements in assembled relationship with the grooves formed in the rivet body.

FIG. 9 is a view similar to FIG. 8, but showing the rivet body in longitudinal section.

FIG. 10 is a much enlarged view of the multiple groove embodiment after the stem has been fully retracted from the rivet which is shown to be inserted through registering openings in a plurality of workpieces.

FIG. 11 is a view similar to FIG. 9 of a multiple groove construction wherein the stem is designed to break prior to complete retraction.

FIG. 12 is a view similar to FIG. 10 showing the broken stem within the rivet body.

FIG. 19 is a view similar to FIGS. 1 and 7 showing a fourth embodiment which is also of the "multiple groove" type.

FIG. 20 shows the assembled relationship of the rivet and stem, the rivet being shown in longitudinal section with the grooves formed therein prior to retraction of the stem.

FIG. 21 shows the rivet in place through registering openings in a plurality of workpieces and after the stem has been retracted and broken.

Description of the preferred embodiments

Figure 1:
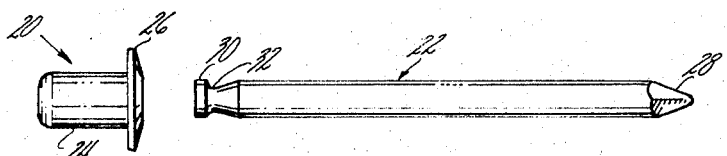
FIG. 1 is an elevational view of a rivet and stem prior to assembly of a first embodiment according to the invention, which embodiment may be referred to as a "single groove" type.

The single groove embodiment of the invention shown in FIGS. 1–6 comprises a rivet 20 and a stem or mandrel 22. The initial shape of the rivet is shown in FIG. 1 and it will be seen to include a generally cylindrical body 24 and a head 26. While an open end hollow rivet may be used, the rivet member 24 preferably has a closed end opposite the head 26, and in any event, it has a central longitudinal bore extending through the head 26. While the head is shown to be concave-convex, it can be flat or formed in any other manner in keeping with conventional practice.

The stem or mandrel 22 looks very much like a nail, having a point 28 at one end and a head 30 at the other end. There is no significance, so far as this invention is concerned, to the pointed end 28, but it does facilitate insertion of the stem or mandrel in a rivet setting tool. On the other hand, the formation of the head 30 is significant. In the embodiment of FIGS. 1–6, the head 30 is formed and defined at the end of the stem 22 by an annular groove 32 cut or otherwise formed in the shank of the stem, the said groove being formed with tapering sides as shown. The diameter of the head 30 is substantially the same as the diameter of the shank or body of the stem.

Figure 2:
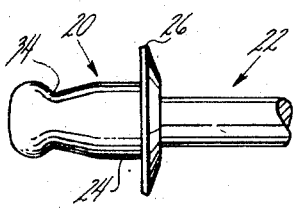
FIG. 2 is an enlarged view of the assembled rivet and stem, showing the groove formed in the rivet body by shaping it into the stem.
Figure 3:
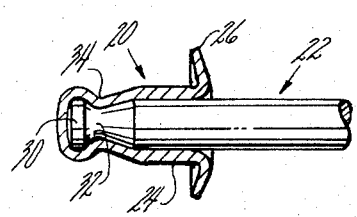
FIG. 3 is a view similar to FIG. 2 but showing the rivet in longitudinal cross-section.

In the assembly of the rivet and stem elements 20 and 22 for ultimate use, the stem 22 is inserted in the bore of the rivet 20, with the head 30 of the stem disposed adjacent the closed end of the cylindrical body of the rivet. With the stem thus inserted, the rivet body 24 is shaped to conform to the inserted stem and to prevent other than forceful retraction of the stem from the rivet. This is done by forming a groove 34 into the rivet body 24 adjacent the stem head 30. That is, the groove 34 in the rivet body 24 is formed by pressing it into the groove 32 defining the head 30 on the stem 22. Preferably, this is done by a rolling process so that the groove 34 is annular. With the rivet shaped to the stem as described, the assembly is ready for use and the parts cannot inadvertently become disassembled. The assembled relationship of the parts is shown in FIGS. 2 and 3, and while it will be seen that the cylindrical body or shank of the stem 22 rather snugly fits the bore in the cylindrical body 24 of the rivet, this can be a loose fit.

When forming the groove 34 in the rivet body 24, that portion of the rivet body so formed is work hardened. As a result, the groove 34 in the rivet body wall has greater strength than the rest of the body wall. This increased strength in the groove is used to advantage in setting the rivet by retraction of the stem as will be described.

While the rivet and stem assembly as thus far described may be used in many ways, it finds very advantageous use in blind fastening. That is, for example, when two flat workpieces such as the plates 36, 36 (FIGS. 4 and 5) are to be fastened together, and access is provided at only one side thereof, the fastening can be achieved by providing an opening through the workpieces of sufficient size to receive the rivet body 24 and by then inserting the rivet in the opening and withdrawing the stem. This forceful withdrawal or retraction of the stem 22 from the rivet 20 after it has been thrust through the opening in the workpieces can be effected by any one of several commercially available pull-stem riveting tools.

Figure 4:
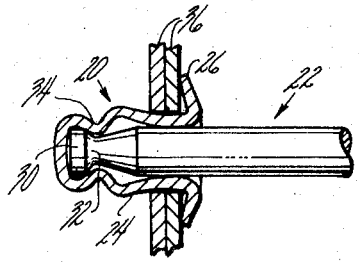
FIG. 4 shows the assembly of FIG. 3 inserted through registering openings in two workpieces being fastened together, the assembly being shown in the course of retraction of the stem or mandrel.

At the very start of such forceful retraction of the stem 22 through the head 26 of the rivet 20, the stem head 30 draws the closed end of the rivet 20 toward the adjacent workpiece. If the groove 34 had not been work hardened in being formed, the stem head 30 might merely pull through the rivet without drawing the closed end toward the head. But, because the groove 34 is work hardened and strengthened, axial retraction of the stem head 30 causes the rivet body groove 34 to start to close as shown in FIG. 4, and the force of such retraction enlarges the diameter of the rivet body 24 as permitted by the opening in the workpieces 36, 36 with the greatest enlargement of the body diameter occurring adjacent the closing groove 34. Obviously, as the rivet body enlarges, a bulge is created on the inaccessible side of the workpieces and thus the rivet firmly fastens the workpieces together between its head 26 and the bulge on its body.

It is to be understood that in keeping with the present invention the stem or mandrel 22 can be provided so that it will break at its neck or groove 32 before its head 30 is fully retracted from the rivet 20. This is, the stem 22 can be provided with a predetermined tensile strength which will cause it to break when the rivet has been set. The stem can also be provided with sufficient tensile strength to permit the completion of forceful retraction of the head 30 through the rivet body as shown in FIG. 5.

Figure 6:
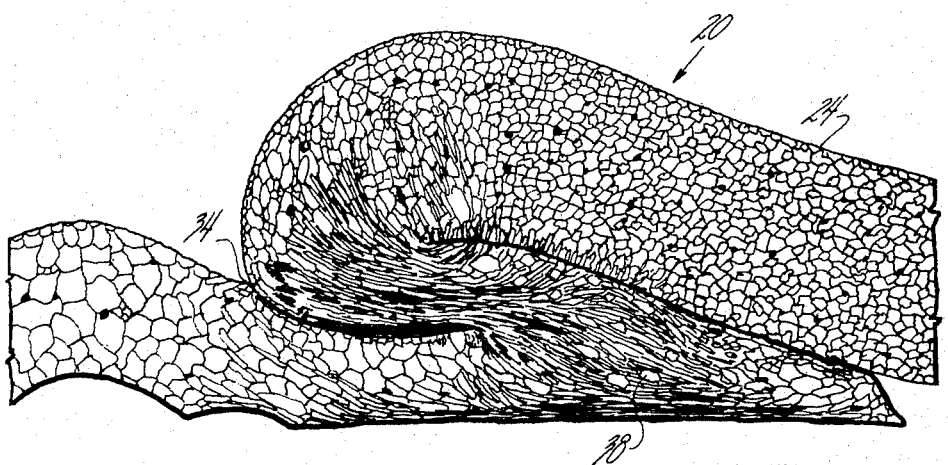
FIG. 6 is a view showing the grooved portion of the rivet body after it has been drawn telescopically within the adjacent body portion, such portions being shown as they appear in a photomicrograph.

When the stem is fully retracted, its head 30 fully closes or collapses the rivet body groove 34 and draws the grooved portion of the body telescopically within the adjacent portion of the rivet body 24 as shown in the photomicrograph view of FIG. 6. All during the time that the rivet body groove 34 is being closed, that portion of the rivet body defining the walls of the groove is being further work-hardened and work hardening also occurs in the remainder of the rivet body wall. When the grooved body portion is telescoped within the adjacent portion, it acquires a distorted grain as shown at 38, this being indicative of work hardening. Also, during the forceful complete retraction of the stem 22, the head 30 will re-define the rivet body bore leaving a substantially smooth and uniform cyclindrical bore therein. It has been found that in such forceful retraction, the head 30 may shear some metal from the rivet in re-defining the rivet bore.

Figure 5:
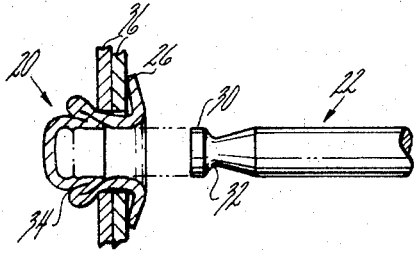
FIG. 5 shows the assembly of FIG. 4 but with the stem or mandrel fully retracted.

The smooth bored rivet left in the workpieces as shown in FIG. 5 has the advantage of providing a work-hardened uniform diameter bore which can be used as a bearing or journal where needed. In addition to being smooth and work-hardened, the said bore is fully leakproof.

In the invention shown in FIGS. 7–12, the rivet is indicated generally by the reference number 40 and the stem or mandrel by the number 42. Here again, the rivet 40 has a head 44 and a body 46, but the cylindrical body may be relatively longer than the body of the rivet described in connection with the first embodiment. The stem 42 is generally like the stem in the first-described embodiment, but is differs in that its head 48 is defined at one end adjacent a much wider annular groove 50.

Here again in the assembly of the construction, the shank or body of the stem 42 rather closely but slidably fits the bore of the rivet body 46, and the stem head 48 is disposed adjacent the closed end of the rivet body. In this embodiment of the invention, however, there are two annular grooves 52, 52 formed in the rivet 40 by rolling or otherwise pressing the body inwardly toward the stem neck 50. As in the first described single groove embodiment, the multiple grooves of this embodiment serve to retain the assembly in assembled relationship of the parts, and the rivet body wall is work hardened in the grooves 52, 52.

Also, as in the first described embodiment, the grooves 52, 52 close in the course of forceful retraction of the stem 42 from the rivet 40 to further work-harden the grooved area of the rivet body and to initiate the bulging or enlarging and consequent work hardening of the rivet body between the grooves and the rivet head 44. It has been found that in providing the external groove or grooves on the body of the rivet that body enlargement takes place at the very beginning of stem retraction. This has the advantage of allowing the rivet body to fill completely a somewhat oversize rivet-receiving opening whereby to tighten a multi-laminar joint or connection.

Also, as in the first described embodiment, the stem or mandrel can be designed to break at the neck 50 and leave the rivet 40 as shown in FIG. 12, or it can be designed for completion of the forceful retraction to leave the rivet as shown in FIG. 10. As in the first embodiment, when the stem is fully retracted, its head 48 re-defines the bore in the rivet and telescopes the grooved portions of the rivet body inside the adjacent portions having the greatest body enlargement. The re-defined bore has a smooth surface and an accurate diameter, thus providing a very desirable bearing or journal.

Figure 13:
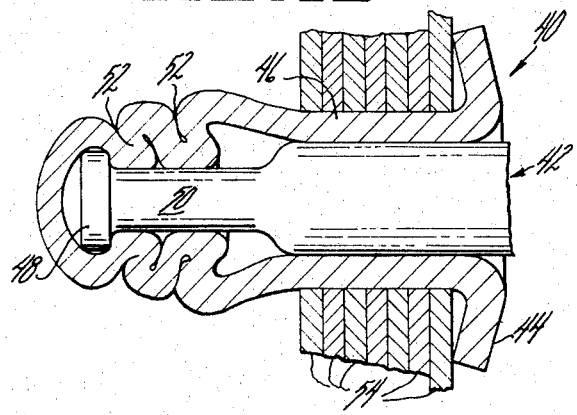
FIG. 13 is a view similar to FIG. 12, but showing a stem which has been severed at the rivet head to increase the shear strength of the set rivet.
Figure 14:
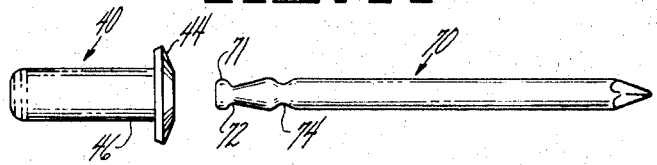
FIG. 14 is a view like FIGS. 1 and 7 showing a third embodiment which is also of the "multiple groove" type.
Figure 15:
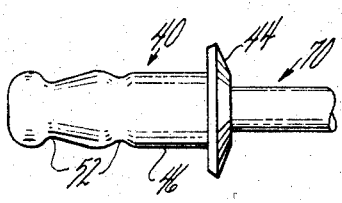
FIG. 15 shows the assembled relationship of the rivet and stem of FIG. 14.

In installations wherein it is desired to break or snap the mandrel prior to complete retraction, it may be desirable to provide a neck 50 of smaller diameter (see FIG. 11) than that shown in FIGS. 7–10 wherein the mandrel is to be fully retracted. In installations wherein the stem is to be used to increase the shear strength of the rivet fastening, the stem may be provided as shown in FIG. 13 with a body diameter that will snugly fit the rivet bore. Thus, when the stem has been retracted sufficiently to set the rivet in the work, the stem is cut off at the rivet head and left embedded in the rivet as shown, obviously to enhance the shear strength of the fastening.

FIGS. 14–18 illustrate a third embodiment of the rivet, this also being a "multiple groove" form. There is no essential difference in this embodiment from that shown in FIGS. 7–13 insofar as the construction of the rivet per se is concerned which is, therefore, designated generally by the reference number 40, its head by the number 44, its body by the number 46, and its two grooves by the number 52.

The essential difference does occur in the construction of the stem which is designated generally by the reference number 70. In this third embodiment of the invention, the stem 70 is formed with a head 71 which is not unlike the heads formed on the stems of the previously described embodiments. The difference in stem construction occurs in that the said stem 70 is provided with two grooves 72 and 74 instead of a single groove or neck such as is provided on the other embodiments. It will be seen in FIGS. 14 and 16 that the groove 72 nearest the head 71 is formed substantially like the groove 32 in the first-described embodiment of FIGS. 1–6. The second groove 74 is formed as an annular groove spaced toward the outer end of the stem from the inner groove 72 with sloping sides.

Figure 16:
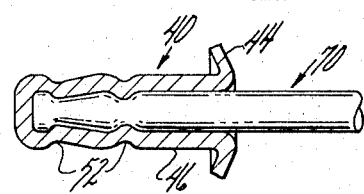
FIG. 16 also shows the assembled relationship of the parts, but with the rivet in longitudinal section.
Figure 17:
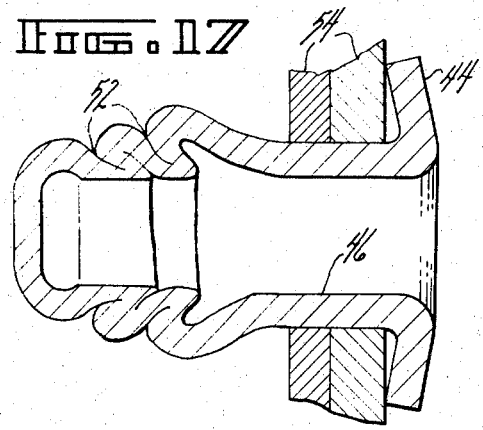
FIG. 17 shows the rivet of FIG. 14 after it has been set by fully rectracting the stem.
Figure 18:
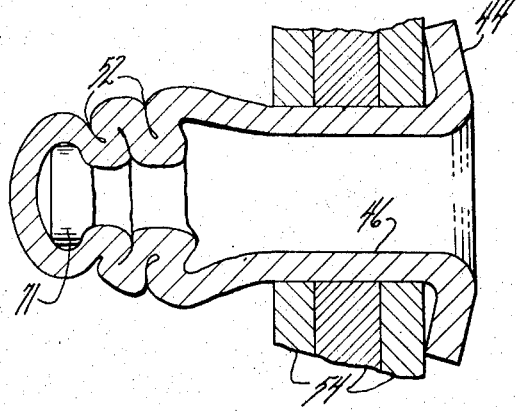
FIG. 18 shows the same rivet as it is set by breaking the stem.

In this embodiment of the invention the grooves 52, 52 formed in the body 46 of the rivet 40 are shaped into the stem grooves 72 and 74 as best shown in FIG. 16. When the grooves are so formed in the rivet body, the assembly is complete and the parts are prevented from disassembly. Like the other described embodiments, the stem can be pulled or retracted wholly from the rivet body and thereby set the rivet body as shown in FIG. 17 to define a smooth surface bearing bore therein, or the stem can be partially retracted and broken off to set the rivet as shown in FIG. 18. FIG. 18 shows only the head 71 remaining from the stem within the rivet, the stem having been snapped immediately adjacent the said head. It will be understood that the stem can be used to increase the shear strength of the set rivet by partial retraction and cut-off in the same manner shown in FIG. 13.

Like the first-described embodiments, when the grooves are formed in the wall of the rivet body, the said grooved portions thereof are work hardened and thus increase their strength to prevent the head of the stem from slipping through the rivet during extraction. Instead, when the stem is extracted the grooves are collapsed for further work hardening thereof and the body portion of the rivet is diametrically enlarged as in the earlier described embodiments.

It is not essential that the head on the stem be formed by providing a neck. That is, the stem can be formed as shown in FIG. 19 wherein the entire body or shank of the stem 60 is formed on one diameter less than that of its head 62. This stem 60 can be used with the multiple groove rivet 40 of the embodiments of FIGS. 7–13 and 14–18, but when so used the stem shank will not have a close sliding fit in the bore of the rivet, the actual fit being shown in FIG. 20.

Here again, the stem can be provided with sufficient tensile strength to be fully retracted, thus leaving a smooth bore in the rivet. On the other hand, the stem can be provided to break or snap, and when this is desired, the stem is notched or provided with indentations 64, 64 near but nonetheless spaced from its head 62 as shown in FIG. 20. The notched or indented stem will break after the rivet body grooves 52 have been closed and the rivet body enlarged to fasten the workpieces as shown in FIG. 21.

What is claimed is:

1. A hollow rivet and pull-stem assembly for blind fastening and the like comprising a rivet having a head, a close end opposite its head and a body provided with an axial bore extending through the head, and an elongated stem inserted in the rivet bore and having an outer portion projecting from the rivet head, the inner end of the stem being provided with a head disposed adjacent the closed end of the rivet and the body of the rivet being pressed inwardly adjacent the stem head to define an external groove whereby to prevent other than forceful retraction of the stem through the head of the rivet, the start of such forceful reraction being effective to close the rivet groove and to enlarge the body diameter of the rivet between the groove and its head as permitted by the opening in a workpiece into which the assembly has been thrust but with a greater enlargement occurring between the groove and workpiece.

2. The rivet and stem assembly defined in claim 1 wherein the rivet bore and stem head are so related in size that completion of the said forceful retraction is effective to draw the closed groove portion of the rivet thereto and to re-define a substantially uniform smooth bore in the rivet having a diameter substanially equal to the stem head diameter.

3. The rivet and stem assembly as defined in claim 2 wherein the head of the stem is not substantially larger in diameter than the shank of the stem and is formed thereon by providing an annular groove in said shank, and wherein the rivet body groove is formed by rolling the rivet body into the groove of the stem shank.

4. A rivet and stem assembly as defined in claim 1 wherein the head of the stem is substantially the same diameter as the shank of the stem and is formed thereon by providing an annular groove in said shank.

5. The rivet and stem assembly of claim 4 wherein the said stem groove is provided with tapering sides and there is a single annular groove pressed into the rivet body by rolling the body into the stem groove.

6. The assembly set forth in claim 4 wherein the stem shank groove is of such diameter as to assure breakage thereof in the course of forceful retraction but after the rivet body groove is substantially closed.

7. A rivet and stem assembly as defined in claim 1 wherein the head of the stem is substantially the same diameter as the shank of the stem and is formed thereon by providing a relatively wide annular groove in the stem shank to define a relatively long neck, and wherein there are at least two external annular grooves which are formed in the rivet body in longitudinally spaced relationship by being pressed inwardly toward the stem neck, each of which rivet grooves is substantially closed in the course of forceful retraction of the stem.

8. The assembly set forth in claim 7 wherein the stem shank and rivet bore are of such size as to provide a relatively close but free sliding fit, and the stem head, upon completion of forceful retraction of the stem through the rivet head, is effective to draw the substantially closed groove portions of the rivet body telescopically within the adjacent body portions and to re-define a substantially uniform smooth bore in the rivet.

9. The assembly set forth in claim 7 wherein the stem neck is reduced to a diameter to assure breakage thereof in the course of said forceful retraction but after said rivet grooves are substantially closed.

10. A rivet and stem assembly as defined in claim 1 wherein the head of the stem is larger in diameter than the shank thereof and wherein at least two annular grooves are formed in the rivet body in longitudinally spaced relationship by being pressed inwardly toward the stem shank, each of which rivet grooves is substantially closed in the course of forceful retraction of the stem.

11. The assembly set forth in claim 10 wherein the stem head and rivet bore provide a relatively close but free sliding fit in initial assembly, and the stem head, upon completion of forceful retraction of the stem through the rivet head, is effective to draw the substantially closed groove portions of the rivet body telescopically within the adjacent body portions and to re-define a substantially uniform smooth bore in the rivet.

12. The assembly set forth in claim 10 wherein the stem shank is indented in spaced relationship to the stem head to provide a weakened area to assure breakage of the stem in the course of said forceful retraction but after said rivet grooves are substantially closed.

13. A rivet and stem assembly as defined in claim 1 wherein there are a plurality of longitudinally spaced apart annular grooves formed in the shank of the stem and a plurality of annular grooves are formed in longitudinally spaced relationship in the rivet body by shaping portions of the rivet body into the annular grooves of the stem, each of which rivet body grooves is substantially closed in the course of forceful retraction of the stem.

14. The assembly set forth in claim 13 wherein at least one stem shank groove is of such diameter as to assure breakage thereof in the course of forceful retraction of the stem but after the rivet body grooves are substantially closed.

References Cited

UNITED STATES PATENTS

| | | | |
|---|---|---|---|
| Re. 20,055 | 8/1936 | Huck | 85—70 |
| 2,324,142 | 7/1943 | Eklund | 85—70 |
| 2,432,949 | 12/1947 | Thorngren | 85—77 |
| 3,055,255 | 9/1962 | Burrell | 85—71 |
| 3,300,798 | 1/1967 | York | 85—77 |

MARION PARSONS, Jr., *Primary Examiner.*

U.S. Cl. X.R.

85—72, 77; 10—27